United States Patent [19]

Hom

[11] 4,291,079

[45] Sep. 22, 1981

[54] METHOD OF MANUFACTURING A HONEYCOMB NOISE ATTENUATION STRUCTURE AND THE STRUCTURE RESULTING THEREFROM

[75] Inventor: Felix Hom, La Mesa, Calif.

[73] Assignee: Rohr Industries, Inc., Chula Vista, Calif.

[21] Appl. No.: 102,766

[22] Filed: Dec. 12, 1979

[51] Int. Cl.³ .............................................. B32B 3/12
[52] U.S. Cl. .................................... 428/116; 52/794; 52/808; 156/64; 156/67; 156/182; 156/249; 156/280; 156/292; 156/307.5; 156/307.7; 181/286; 181/292; 428/305
[58] Field of Search ............... 156/64, 292, 67, 307.5, 156/182, 307.7, 249, 315, 280, 327; 428/116, 322, 305; 52/794, 808; 181/286, 292

[56] References Cited

U.S. PATENT DOCUMENTS

| | | | |
|---|---|---|---|
| 2,925,193 | 2/1960 | Gibb | 156/91 |
| 3,044,919 | 7/1962 | Stoneburner | 156/71 |
| 3,332,816 | 7/1967 | Kalinowski | 156/307.7 |
| 3,591,445 | 7/1971 | Schonberg et al. | 156/67 |
| 3,767,517 | 10/1973 | Williams | 156/67 |
| 3,977,492 | 8/1976 | Haskel | 181/292 |
| 4,001,473 | 1/1977 | Cook | 428/116 |

FOREIGN PATENT DOCUMENTS 1266473 12/1961 France ................................. 156/67
1373063 11/1974 United Kingdom ................ 428/116

Primary Examiner—John J. Gallagher
Attorney, Agent, or Firm—Patrick J. Schlesinger; Frank D. Gilliam

[57] ABSTRACT

Method of fabricating attenuation sandwich panels having a central cellular core positioned between and bonded to an imperforate facing sheet on one surface thereof and a perforate facing sheet with an outer layer of porous fibrous material adhered to the other surface. The combined perforate sheet and porous fibrous material have a predetermined open surface area prior to attenuation panel fabrication. The porous fibrous surface is then saturated with a combined liquidous anti-wetting and indicator solution which coats substantially all of the fibers. The solution is allowed to dry and the opposite side is inspected for any indicator present. If indicator is detected on the opposite side of the perforate sheet from the porous fibrous material, it is removed therefrom. The components making up the panel are then assembled and bonded together to form the attenuation panel. For some applications, the perforation exposed surface of the combined perforate sheet and porous fibrous material is covered with a maskant material which covers the surface only, prior to the application of the combined liquidous anti-wetting and indicator solution. The maskant is removed prior to the inspection for indicator.

8 Claims, 4 Drawing Figures

METHOD OF MANUFACTURING A HONEYCOMB NOISE ATTENUATION STRUCTURE AND THE STRUCTURE RESULTING THEREFROM

BACKGROUND OF THE INVENTION

This invention relates to a method of manufacturing new and improved noise attenuating panels and more particularly to a sandwich panel having a central cellular core having endwise directed cells with an imperforate sheet bonded thereto on one surface and the perforation exposed surface of a perforate facing sheet with a layer of porous material bonded thereto bonded to the opposite core surface, wherein there is continuous communication between the core cells and the atmosphere adjacent to the noise to be attenuated. The product manufactured under the method of the invention is specifically suitable for use in a severe environment, such as, for example, lining the high velocity surfaces of an aircraft turbo fan engine.

In manufacturing sound attenuating metal honeycomb sandwich panels which are exposed to an extreme environment and are utilized to suppress a wide range of noise sound frequencies, it is common practice to provide a cellular structure utilizing the Helmholtz resonance principle, wherein a first imperforate sheet of material is bonded to one core surface of a sheet of cellular core material and a thin perforate sheet of like material is applied to the opposite core surface.

Panels having this general type of construction, although satisfactory for attenuating some specific sound frequencies, are found to be inefficient noise attenuators for a broad range of frequencies customarily encountered in and around modern aircraft jet engines. Additionally, it has been found that the perforations of the perforated sheet when exposed directly to a high speed gas flow across their surface create turbulence to that flow. Other known concepts have included interposing a sheet of fibrous material between the perforate sheet and the core surface. This has proven to be unsound structurally when used in severe environments for providing both attenuation and structural integrity or on exterior aircraft surfaces exposed to high speed inflight air flow.

Attempts to successfully manufacture various other sound attenuation materials of this general type have been unsuccessful in that the adhesive used for bonding the perforate sheet to the core will without exception ooze or wick into the perforations of the perforated sheet during assembly and at least fill some of the perforations. The blocking off of the perforations reduces the effective open area of the perforated sheet which in turn increases the desired flow resistance between the source of the sound to be attenuated and the cells of the core. When the number of perforations or the perforation size is increased to overcome the blocking of some of the perforations to maintain the desired flow resistance, the structural strength of the sandwiched structure is correspondingly reduced and the flow turbulence thereacross is increased. In those structures which include porous fibrous material positioned between the perforate sheet and the core structure, the adhesive wicks into the pores of the fibrous material in addition to the blocking of some perforations, thus further increasing the flow resistance and reducing the attenuation effectiveness of the structure.

SUMMARY OF THE INVENTION

It is the primary object of this invention to produce a sound attenuation material for use in a severe environment wherein the perforations as well as the pores of the porous fibrous material are substantially free of any bonding adhesive.

Another object of this invention is to provide a method of manufacturing sound attenuation material wherein the openings between the outer surface of the attenuating material and the core have a predetermined flow resistance.

Still another object of this invention is to provide a method of manufacturing sound attenuation material wherein the adhesive used for bonding the perforate sheet and porous fibrous material to the core is prevented from wicking through the perforations into the porous fibrous material.

Still a further object of this invention is to provide a means for determining if the anti-wetting solution used during a step of the manufacturing method comes in contact with surfaces to be adhesive bonded.

These and other objects and advantages of the invention will become better understood by reference to the following detailed description when considered together with the accompanying drawings, in which:

DETAILED DESCRIPTION OF THE PREFERRED EMBODIMENT

Figure 1:
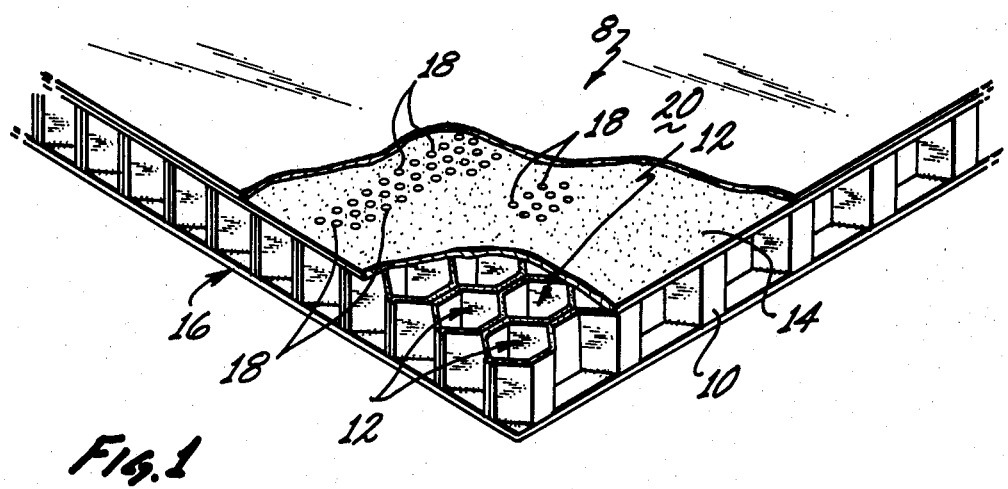
FIG. 1 is a perspective view of the honeycomb noise attenuation structure constructed by the method of the invention.
Figure 2:
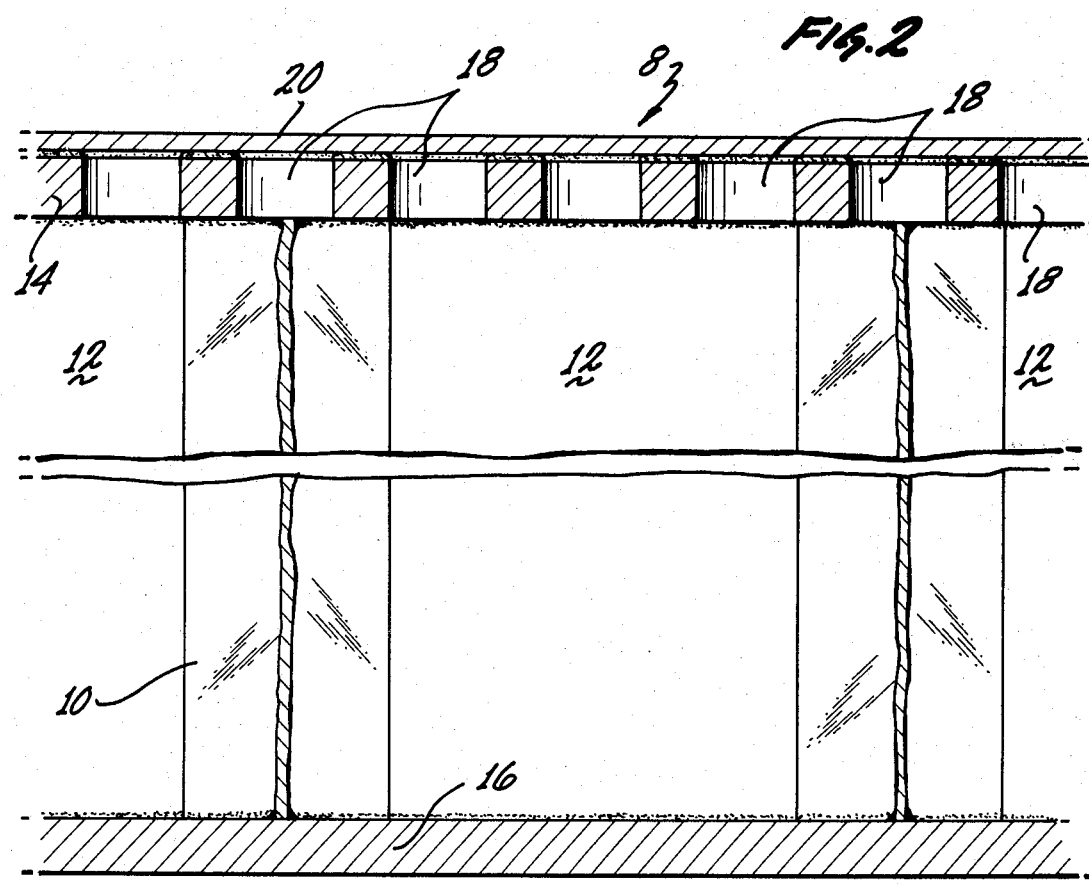
FIG. 2 is an enlarged fragmentary vertical section of the structure of FIG. 1.
Figure 3A:
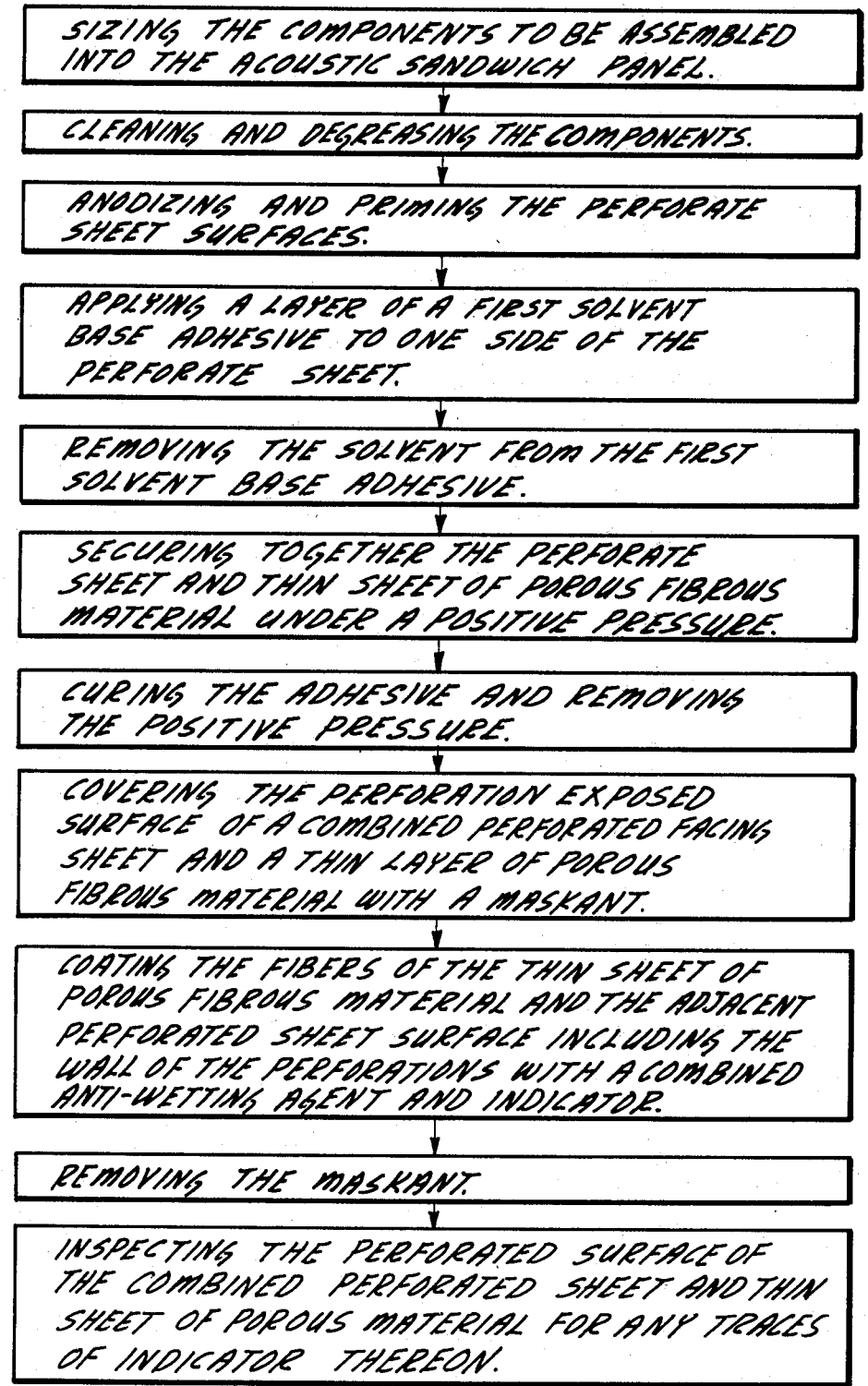
FIGS. 3A and 3B combined is a flow diagram of the steps of the method of manufacturing the attenuation sandwich structure.
Figure 3B:
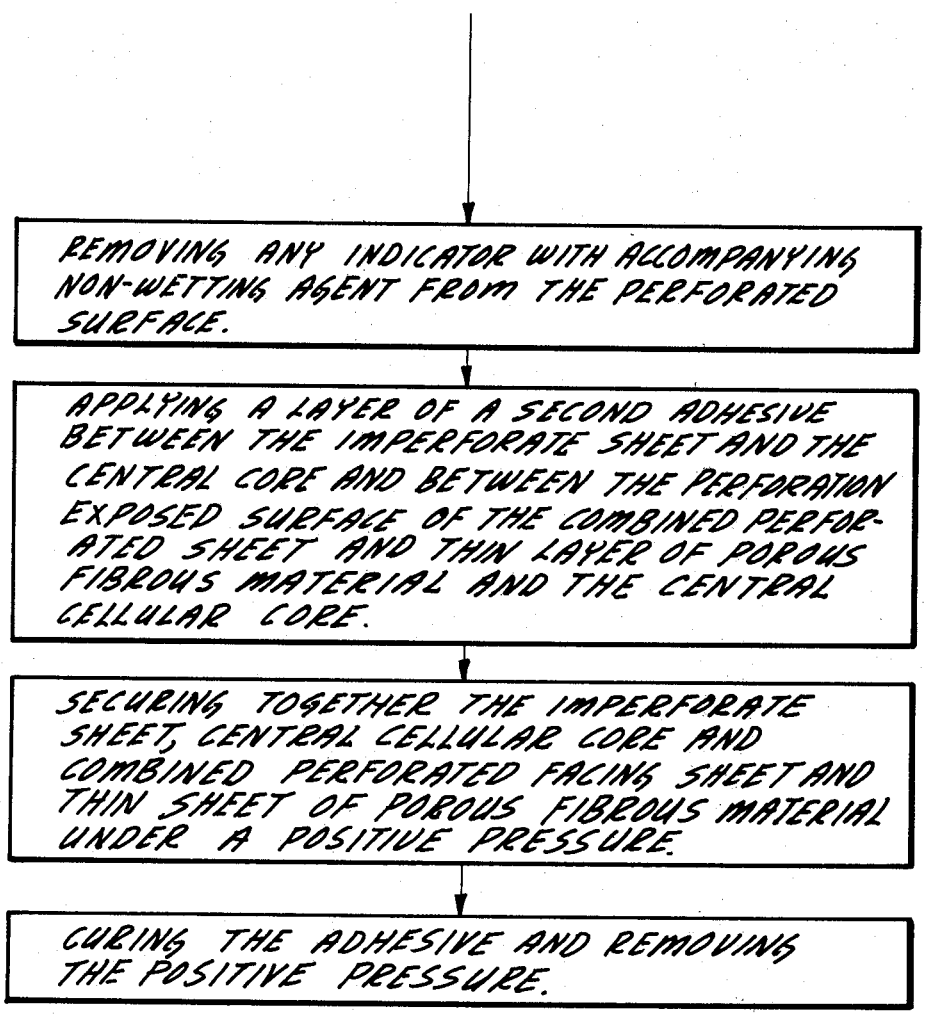

Referring now to the drawings in detail, the attenuation sandwich structure 8 comprises a single honeycomb core 10 having a usual multiplicity of endwise directed cells 12 therein, a thin imperforate facing sheet 16, a perforated facing sheet 14 having a multiplicity of perforations 18 of a preselected cross sectional area, and a thin sheet of porous fibrous material 20 which preferably is a stainless steel woven material, metallic fibrous felt or any of a number of various other fibrous materials including graphite, nylon or the like. In preferred embodiment, a woven material normally referred to as having a Dutch Twill weave with its fiber cross-over points unjoined or in some instances with the cross-over points joined.

It has been found that even in using specific care in selecting an adhesive with a high viscosity index for bonding together the various components of the sound attenuation panel, an undesirable amount of the adhesive tends to ooze or wick through the perforations 18 of the perforated sheet 14 and into the pores of the porous fibrous material 20 which results in a reduction of the effective open area between the sound source and the cells 12 of the central cellular core section 12. This wicking effect is caused by surface energy due to the wetability of the surface of the perforated skin 14 and the capillary action of the porous fibrous material 20.

The desired adhesive used for bonding together the perforated sheet 18 and the porous fibrous material 20 is preferably a nitrous phenolic solvent base adhesive, for example either AF31 manufactured by the 3M Company, or other adhesives having the same or similar characteristics. These adhesives consist of a low solid solvent solution. When the solvents are removed from these solutions by evaporation at ambient or elevated temperatures the viscosity index is elevated. Other adhesives, such as 100% epoxy adhesive, one example being FM 150 manufactured by Bloomingdale Aerospace Products, are typically used to bond the imperforate sheet 16 to the honeycomb core 8. It should be noted that adhesives other than FM 150 which have the same or similar characteristics may be used to practice the invention.

The first step of the manufacturing process is to clean and degrease the imperforate sheet 16, the central core 10 and the perforated sheet 14 to insure that all surfactants have been removed to provide a satisfactory bond therebetween.

An optional next step of the manufacturing process is to apply a non-conductive anodic coating to all surfaces of the perforate sheet 14. This may be followed by a primer coat which is compatible with the preferred adhesive or the primer coat may be used without the non-conductive anodic coating.

The next step of the manufacturing process is to bond the fibrous porous material 20 to one surface of the perforated sheet 14. The adhesive selected for bonding the perforate sheet 14 to the porous material 20 is preferably applied by spraying a thin layer of one of the aforementioned adhesives, preferably AF31, on one surface of the perforate sheet 14. The solvent from the adhesive is then removed by evaporation at ambient or elevated temperature as herein before discussed. The substantially solid or highly viscous adhesive remaining after solvent removal does not soften and flow during the cure cycle as does the FM 150 or the like used on the imperforate sheet 16 but becomes tacky and adheres to rather than flowing into the fibers of the porous material 20 when the two are being bonded together. After the removal of the solvent from the adhesive, the porous fibrous material 20 is then placed on the adhesive coated surface of the perforate sheet 14 and a positive force is applied between the porous fibrous material 20 and the perforate sheet 14 while at a selected elevated curing temperature. Pressure and heat can be applied by any well known means, such as, for example, a press, a vacuum autoclave or the like with local temperature control. The pressure required is generally in the range of 50 psi, and the temperature in the range of 250° F. to 350° F.

To reduce or substantially eliminate the aforementioned surface energy the porous fibrous material 20 and the adjacent surface of the perforated sheet 14 is treated with an anti-wetting solution which also contains an indicator such as, for example, a pigment dye visible in natural light, a dye visible under ultra-violet light, etc.

In the preferred embodiment, this treatment is accomplished prior to the final attenuation panel assembly by coating the now combined porous fibrous material 20 and adjacent side of perforate sheet 14 with a liquidous material, such as Frekote 33, is a semi-organic polymer comprising Methylene Chloride 30.7%, Trichlorotrefluoroethane 38.8%, Xylene 3.9%, VM & P Naptha and Perchloroethylene 0.9%. (a trademarked product of Frekote Inc.) or similar materials having the same or similar anti-wetting characteristics containing the indicator.

The combined anti-wetting and indicator solution is then allowed to dry leaving a coating on the contacted surfaces.

The perforation exposed surface of the perforated sheet 14 is then visually inspected for traces of the indicator which may have bled through the perforation. If a colored dye is utilized as the indicator natural light is sufficient for detection. If phosphorescent dye is utilized as the indicator then the surface must be illuminated with ultra-violet light to detect the indicator. All areas of the perforation exposed surface of the perforated sheet 14 where dye is present must be sufficiently cleaned to remove the dye and the accompanying anti-wetting solution.

An alternate method is to cover the still exposed surface of the perforated sheet (the side to be ultimately bonded to the cellular core) with a maskant material which substantially prevents any of the combined anti-wetting and indicator solution from coating any portion of that covered surface. After the application and drying of the combined anti-wetting and indicator solution the maskant is then removed and the surface is inspected as aforementioned and the surface is cleaned as required. Heavy paper with a non-drying adhesive coating has been used successfully as such a maskant; however, any other means accomplishing this same result may be used equally as well.

The imperforate sheet 16, the core 10, and the combined perforate sheet 14 and porous fibrous material 20 are then appropriately coated with a layer of adhesive for the bonding of the face sheets 16, 14 to the cell faces of the cellular core 10. The components of the attenuation sandwich structure are then stacked as shown in the various figures, namely, the honeycomb core 10 is sandwiched between the imperforate sheet 16 and the perforation exposed surface of the combined perforate sheet 14 and porous fibrous material 20; pressure is then applied from the now outer surface of the imperforate sheet and the porous fibrous material toward the central honeycomb core along arrows 22. This pressure can be applied by any convenient means as aforementioned. The adhesive on the combined components under pressure is then allowed to cure according to the manufacturer's suggested practice.

Although the foregoing invention has been described in some detail by way of illustration and example for the purpose of clarity of understanding it should be understood that certain changes and modifications may be practiced within the scope of the invention as limited only by the scope of the appended claims.

What is claimed as new and useful and desired to be secured by United States Letters Patent is:

1. A process for manufacturing an improved acoustic sandwich panel for attenuating a wide range of noise frequencies which is suitable structurally for use in a severe environment, said sandwich panel including a central cellular core positioned between an imperforate facing sheet and a perforated facing sheet having a plurality of perforations therethrough, the opposite side of the perforated sheet from said central cellular core having a thin layer of porous fibrous material bonded thereto that has a predetermined flow through resistance, the steps of the process comprising:

(a) cleaning and degreasing the imperforate sheet, central cellular core, perforate facing sheet and thin layer of porous fibrous material;

(b) applying a layer of a solvent base adhesive to one side of the perforated sheet;

(c) removing the solvent from the layer of solvent base adhesive;

(d) securing together the solvent base coated surface to the perforate sheet and the thin sheet of porous fibrous material under a positive pressure;

(e) curing the solvent base adhesive and removing the positive pressure;

(f) coating the fibers of the thin sheet of porous fibrous material and the perforated sheet surface adjacent thereto with a solution comprising an anti-wetting agent and an indicator;

(g) inspecting the opposite perforated surface of the combined perforated sheet for any trace of the indicator thereon;

(h) removing any indicator with accompanying non-wetting agent from the opposite perforated surface;

(i) applying a layer of a second adhesive between the imperforate sheet and the central cellular core and between the perforation exposed surface of the combined perforated sheet and thin layer of porous fibrous material and the central cellular core;

(j) securing together the imperforate sheet, central cellular core and combined peforate facing sheet and thin sheet of porous fibrous material under a positive pressure; and (k) curing the second adhesive and removing the positive pressure.

2. The method of manufacturing as set forth in claim 1, including an additional step of applying a primer coating on the perforated sheet surface between steps a and b.

3. The method of manufacturing as set forth in claim 1, including an additional step of applying non-conductive coating on the preforated sheet between steps a and b is accomplished.

4. The method of manufacturing as set forth in claim 1, including additional steps of covering the perforation exposed surface of the combined perforated facing sheet and thin sheet of porous fibrous material with a maskant is accomplished between steps e and f and removing the maskant between steps f and g.

5. A process for manufacturing an improved acoustic sandwich panel for attenuating a wide range of noise frequencies which is suitable structurally for use in a severe environment, said sandwich panel including a central cellular core positioned between an imperforate facing sheet and a perforated facing sheet having a plurality of perforations therethrough, the opposite side of the perforated sheet from said central core having a thin layer of porous fibrous material with a pre-determined flow through resistance, the process comprising;

(a) cleaning and degreasing the imperforate sheet, central cellular core, perforate facing sheet and thin layer of porous fibrous material;

(b) anodizing and priming the perforate sheet surfaces;

(c) applying a layer of a solvent base adhesive to one surface of the perforate sheet;

(d) removing the solvent from the layer of solvent base adhesive;

(e) securing together the solvent base adhesive coated surface of the perforate sheet and the thin sheet of porous fibrous material under a positive pressure;

(f) curing the solvent base adhesive and removing the positive pressure;

(g) covering the perforation exposed surface of a combined perforated facing sheet and thin layer of porous fibrous material with a maskant;

(h) coating the fibers of the thin sheet of porous fibrous material and the perforated sheet surface adjacent thereto including the wall of the perforations with a solution comprising an anti-wetting agent and an indicator;

(i) removing the maskant;

(j) inspecting the opposite perforated surface of the combined perforated sheet for any trace of the indicator thereon;

(k) removing any indicator with accompanying non-wetting agent from the opposite perforated surface;

(l) applying a layer of a second type adhesive between the imperforate sheet and the central cellular core and between the perforation exposed surface of the combined perforated sheet and thin layer of porous fibrous material and the central cellular core;

(m) securing together the imperforate sheet, central cellular core and combined perforate facing sheet and thin sheet of porous fibrous material under a positive pressure; and (n) curing the second adhesive and removing the positive pressure.

6. The method of manufacturing as set forth in claims 1 or 5, wherein the inspection step is accomplished under natural light.

7. The method of manufacturing as set forth in claims 1 or 5, wherein when detecting a phosphorescent indicator the inspecting step is accomplished under ultraviolet light.

8. The product produced from the methods of claims 1 or 5.

* * * * *